US012682229B2

(12) United States Patent
Copty

(10) Patent No.: US 12,682,229 B2
(45) Date of Patent: Jul. 14, 2026

(54) MACHINE LEARNING IN A CONTINUOUS INTEGRATION AND DEPLOYMENT ENVIRONMENT FOR COMPLIANCE AND SECURITY OF INFRASTRUCTURE AS CODE

(71) Applicant: International Business Machines Corporation, Armonk, NY (US)

(72) Inventor: Fady Copty, Nazareth (IL)

(73) Assignee: International Business Machines Corporation, Armonk, NY (US)

( * ) Notice: Subject to any disclaimer, the term of this patent is extended or adjusted under 35 U.S.C. 154(b) by 1062 days.

(21) Appl. No.: 17/215,021

(22) Filed: Mar. 29, 2021

(65) Prior Publication Data

US 2022/0309337 A1 Sep. 29, 2022

(51) Int. Cl.
| | |
|---|---|
| *G06N 3/08* | (2023.01) |
| *G06F 8/77* | (2018.01) |
| *G06F 21/57* | (2013.01) |
| *G06N 3/04* | (2023.01) |

(52) U.S. Cl.
CPC ................ *G06N 3/08* (2013.01); *G06F 8/77* (2013.01); *G06F 21/577* (2013.01); *G06N 3/04* (2013.01); *G06F 2221/033* (2013.01)

(58) Field of Classification Search
CPC .... G06N 3/08; G06N 3/04; G06F 8/77; G06F 21/577; G06F 2221/033; G06F 21/57
See application file for complete search history.

(56) References Cited

U.S. PATENT DOCUMENTS

| | | | | |
|---|---|---|---|---|
| 10,565,093 | B1 * | 2/2020 | Herrin | G06F 8/77 |
| 10,832,150 | B2 * | 11/2020 | Barry | G06N 20/00 |
| 10,872,029 | B1 * | 12/2020 | Bawcom | G06F 21/6218 |
| 2019/0026085 | A1 | 1/2019 | Bijani et al. | |
| 2019/0109872 | A1 * | 4/2019 | Dhakshinamoorthy | G06F 21/577 |
| 2019/0171966 | A1 | 6/2019 | Rangasamy | |
| 2019/0318366 | A1 * | 10/2019 | Carranza | G06N 3/08 |
| 2019/0370473 | A1 * | 12/2019 | Matrosov | G06N 3/044 |
| 2020/0341876 | A1 * | 10/2020 | Gandhi | H04L 67/34 |
| 2020/0379879 | A1 | 12/2020 | Plotnik et al. | |
| 2021/0149788 | A1 * | 5/2021 | Downie | G06F 11/3604 |
| 2021/0319174 | A1 * | 10/2021 | Raj | G06F 40/242 |

(Continued)

OTHER PUBLICATIONS

Fontana et al., "Code smell severity classification using machine learning techniques", 2017, Knowledge-Based Systems, vol. 128, pp. 43-58 (Year: 2017).*

(Continued)

*Primary Examiner* — Van C Mang
(74) *Attorney, Agent, or Firm* — Harrity & Harrity, LLP

(57) ABSTRACT

In an approach for policy security shifting left of infrastructure as code compliance, a processor trains a neural network model to classify a code per policy and provide a policy vector score for the code associated with one or more policies. A processor enables the neural network model to scan and score a new code during a continuous integration and continuous deployment pipeline. A processor outputs a scanned score of the new code to a user. A processor retrains the neural network model by capturing a continuous integration and continuous deployment change and run-time compliance posture that occurs as a response by the user.

15 Claims, 7 Drawing Sheets

200

TRAIN A NEURAL NETWORK MODEL TO CLASSIFY A CODE PER POLICY AND PROVIDE A POLICY VECTOR SCORE FOR THE CODE ASSOCIATED WITH ONE OR MORE POLICIES — 202

ENABLE THE NEURAL NETWORK MODEL TO SCAN AND SCORE A NEW CODE DURING A CONTINUOUS INTEGRATION AND CONTINUOUS DEPLOYMENT PIPELINE — 204

OUTPUT A SCANNED SCORE OF THE NEW CODE TO A USER — 206

RETRAIN THE NEURAL NETWORK MODEL BY CAPTURING A CONTINUOUS INTEGRATION AND CONTINUOUS DEPLOYMENT CHANGE AND RUN-TIME COMPLIANCE POSTURE THAT OCCURS AS A RESPONSE BY THE USER — 208

(56) References Cited

U.S. PATENT DOCUMENTS

2022/0156641 A1* 5/2022 Fujii ...................... G06N 20/00

OTHER PUBLICATIONS

Veggalam, "IFuzzer: An Evolutionary Interpreter Fuzzer Using Genetic Programming", 2016, Computer Security—ESORICS 2016, vol. 2016, pp. 581-601 (Year: 2016).*

Nembhard et al., "A hybrid approach to improving program security", 2017, 2017 IEEE Symposium Series on Computational Intelligence (SSCI), vol. 2017, pp. 1-8 (Year: 2017).*

Chen et al., "An Approach to Identifying Error Patterns for Infrastructure as Code", 2018, Proceedings—29th IEEE International Symposium on Software Reliability Engineering Workshops, ISSREW 2018, vol. 29 (2018), pp. 124-129 (Year: 2018).*

Logicworks, "Logicworks Launches Infrastructure-as-Code Platform Pulse to Deliver Security & Automated Best Practices", 2018, retrieved from https://www.logicworks.com/blog/2018/02/logicworks-launches-infrastructure-code-platform-pulse-deliver-security-automated-best-practices/ on Mar. 8, 2024 (Year: 2018).*

Logicworks, "Security Risks in Public Cloud: The Tightrope Walk of Digital Transformation", 2020, retrieved from https://www.logicworks.com/blog/2020/02/security-risks-in-public-cloud/ on Mar. 8, 2024 (Year: 2020).*

Chernis et al., "Machine Learning Methods for Software Vulnerability Detection", 2018, IWSPA '18: Proceedings of the Fourth ACM International Workshop on Security and Privacy Analytics, vol. 4 (2018), pp. 31-39 (Year: 2018).*

Mosolygo et al., "Towards a Prototype Based Explainable JavaScript Vulnerability Prediction Model", Mar. 27, 2021, 2021 International Conference on Code Quality (ICCQ), vol. 2021, pp. 15-25 (Year: 2021).*

Mirakhorli et al., "Detecting, Tracing, and Monitoring Architectural Tactics in Code", 2016, IEEE Transactions on Software Engineering, vol. 42 No. 3, pp. 205-220 (Year: 2016).*

Lemieux et al., "FairFuzz: a targeted mutation strategy for increasing greybox fuzz testing coverage", 2018, ASE '18: Proceedings of the 33rd ACM/IEEE International Conference on Automated Software Engineering, vol. 33 (2018), pp. 475-485 (Year: 2018).*

Gao et al., "Fuzz Testing based Data Augmentation to Improve Robustness of Deep Neural Networks", 2020, 2020 IEEE/ACM 42nd International Conference on Software Engineering (ICSE), vol. 42 (2020), pp. 1147-1158 (Year: 2020).*

Shahin et al., "Beyond Continuous Delivery: An Empirical Investigation of Continuous Deployment Challenges", 2017, 2017 ACM/IEEE International Symposium on Empirical Software Engineering and Measurement (ESEM), vol. 2017, pp. 111-120 (Year: 2017).*

Atlassian, "What is Continuous Integration?", Feb. 22, 2021, retrieved from https://web.archive.org/web/20210222160537/https://www.atlassian.com/continuous-delivery/continuous-integration on Nov. 1, 2024 (Year: 2021).*

Andrzejak et al., "Detection of Memory Leaks in C/C++ Code via Machine Learning", 2017, 2017 IEEE International Symposium on Software Reliability Engineering Workshops (ISSREW), vol. 2017, pp. 252-258 (Year: 2017).*

Hulette, "Predicting Fault Locations from Failures Using a Machine Learning Classifier", 2007, University of California, San Diego (Year: 2007).*

Gupta et al., "DeepFix: Fixing Common C Language Errors by Deep Learning", 2017, Proceedings of the Thirty-First AAAI Conference on Artificial Intelligence, vol. 31, pp. 1345-1351 (Year: 2017).*

Lenarduzzi et al., "Towards Surgically-Precise Technical Debt Estimation: Early Results and Research Roadmap", 2019, Proceedings of the 3rd ACM SIGSOFT International Workshop on Machine Learning Techniques for Software Quality Evaluation, vol. 2019, pp. 37-42 (Year: 2019).*

"Shifting Cloud Security Left with Infrastructure as Code", DivvyCloud, Apr. 2020, 11 pages, <www.divvycloud.com/get-started>.

Mell et al., "The NIST Definition of Cloud Computing", Recommendations of the National Institute of Standards and Technology, Special Publication 800-145, Sep. 2011, 7 pages.

* cited by examiner

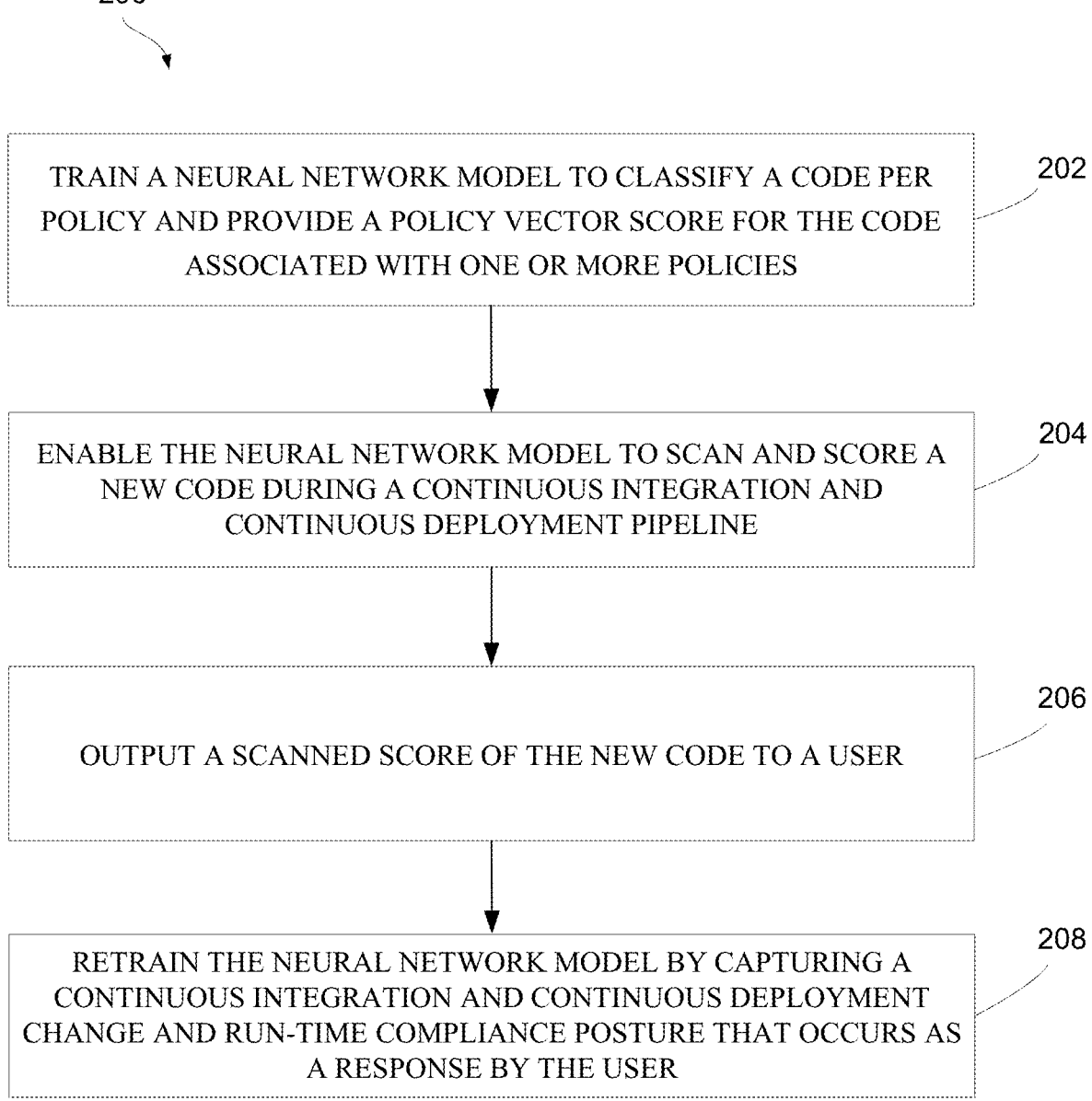

200

TRAIN A NEURAL NETWORK MODEL TO CLASSIFY A CODE PER POLICY AND PROVIDE A POLICY VECTOR SCORE FOR THE CODE ASSOCIATED WITH ONE OR MORE POLICIES — 202

ENABLE THE NEURAL NETWORK MODEL TO SCAN AND SCORE A NEW CODE DURING A CONTINUOUS INTEGRATION AND CONTINUOUS DEPLOYMENT PIPELINE — 204

OUTPUT A SCANNED SCORE OF THE NEW CODE TO A USER — 206

RETRAIN THE NEURAL NETWORK MODEL BY CAPTURING A CONTINUOUS INTEGRATION AND CONTINUOUS DEPLOYMENT CHANGE AND RUN-TIME COMPLIANCE POSTURE THAT OCCURS AS A RESPONSE BY THE USER — 208

FIG. 2

MACHINE LEARNING IN A CONTINUOUS INTEGRATION AND DEPLOYMENT ENVIRONMENT FOR COMPLIANCE AND SECURITY OF INFRASTRUCTURE AS CODE

BACKGROUND

The present disclosure relates generally to the field of machine learning and neural networks, and more particularly to policy security shifting left of infrastructure as code compliance and testing to cover interface languages and flavors, using artificial intelligence and continuous training.

"Shift left" can be a practice intended to find and prevent defects early in a software delivery process. The idea is to improve quality by moving tasks to the left as early in a lifecycle as possible. Shift left security may refer to moving security to the earliest possible point in a development process. Artificial intelligence may refer to a broad set of methods, algorithms, and technologies that enable systems, either in software or embodied forms, to display aspects of intelligent behavior in a way that may seem human-like to an outside observer. As a part of augmented intelligence and artificial intelligence, machine learning may refer to a wide variety of algorithms and methodologies that enable systems to improve the systems' performance over time as the machine learning obtains more data and learns from the data. Deep learning may be a type of machine learning that employs a multi-layer hierarchical neural network architecture and an end-to-end approach to training where the system is trained by a set of input data and desired output with learning happening in the intermediate layers. The system may learn to adjust weights of the interconnections in the training process.

SUMMARY

Aspects of an embodiment of the present disclosure disclose an approach for policy security shifting left of infrastructure as code compliance. A processor trains a neural network model to classify a code per policy and provide a policy vector score for the code associated with one or more policies. A processor enables the neural network model to scan and score a new code during a continuous integration and continuous deployment pipeline. A processor outputs a scanned score of the new code to a user. A processor retrains the neural network model by capturing a continuous integration and continuous deployment change and run-time compliance posture that occurs as a response by the user.

BRIEF DESCRIPTION OF THE DRAWINGS

FIG. 2 is a flowchart depicting operational steps of a shifting left module within a computing device of FIG. 1, in accordance with an embodiment of the present disclosure.

DETAILED DESCRIPTION

The present disclosure is directed to systems and methods for policy security shifting left of infrastructure as code compliance and testing to cover interface languages and flavors, using artificial intelligence and continuous training.

Embodiments of the present disclosure recognize a need for moving security to the earliest possible point (sometimes called "shift left" security) in a software development process. For example, an infrastructure as code may be coded using various coding languages and flavors per cloud provider, e.g., using common language infrastructure (CLI), node JavaScript (nodeJS), Python, Go-language, Terraform, Ansible. Syntax and semantics can vary across cloud providers. Embodiments of the present disclosure recognize a need for shifting-left security policies that should be applied to an infrastructure as code at an early phase (e.g., a testing phase), due to the large number of languages and flavors. Embodiments of the present disclosure disclose a method of shifting left all checks that apply to a post-deployment account, into infrastructure as code checks.

Embodiments of the present disclosure disclose systems and methods for automatically shifting cloud security-left with infrastructure as code checks by leveraging a deep neural network which is capable of classifying an infrastructure as code based on cloud provider policies. For example, the policies can be industry-specific methodology requirements, cost estimate checks, or project-specific tests. Embodiments of the present disclosure disclose training a deep neural network to classify infrastructure as codes per policy and provide a policy vector score for each infrastructure as code. Embodiments of the present disclosure disclose enabling a deep neural network to scan an infrastructure as code and score the code during a continuous integration/continuous deployment pipeline. Embodiments of the present disclosure disclose providing scanned results from the deep neural network to a user as a warning or an alert. Embodiments of the present disclosure disclose constantly updating a deep neural network, by comparing scanned results to actual results of the infrastructure as code deployed, and by collecting user-interaction with scanned results.

Figure 1:
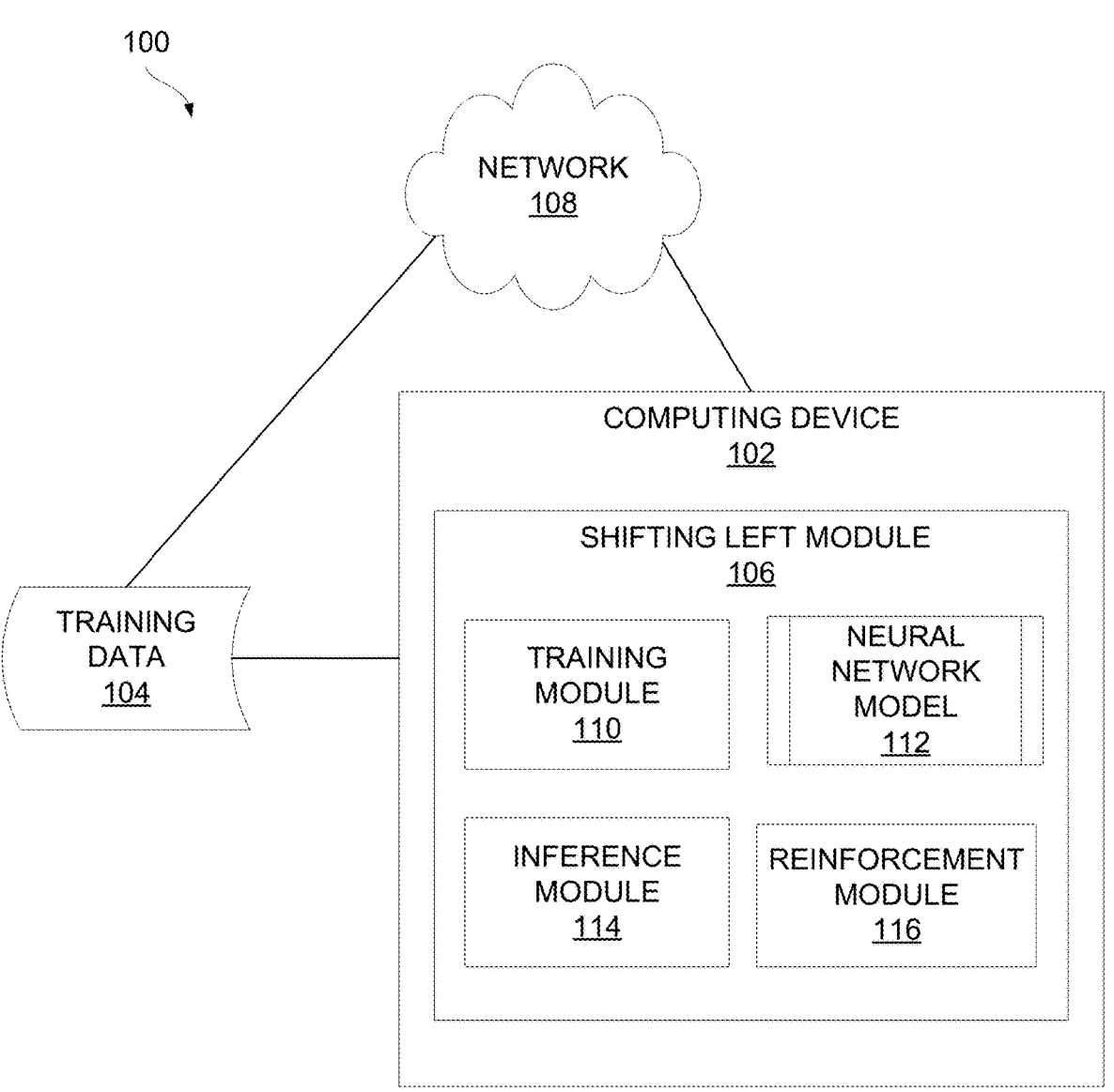
FIG. 1 is a functional block diagram illustrating a policy security shifting left environment, in accordance with an embodiment of the present disclosure.
Figures 3A, 3B, 3C:
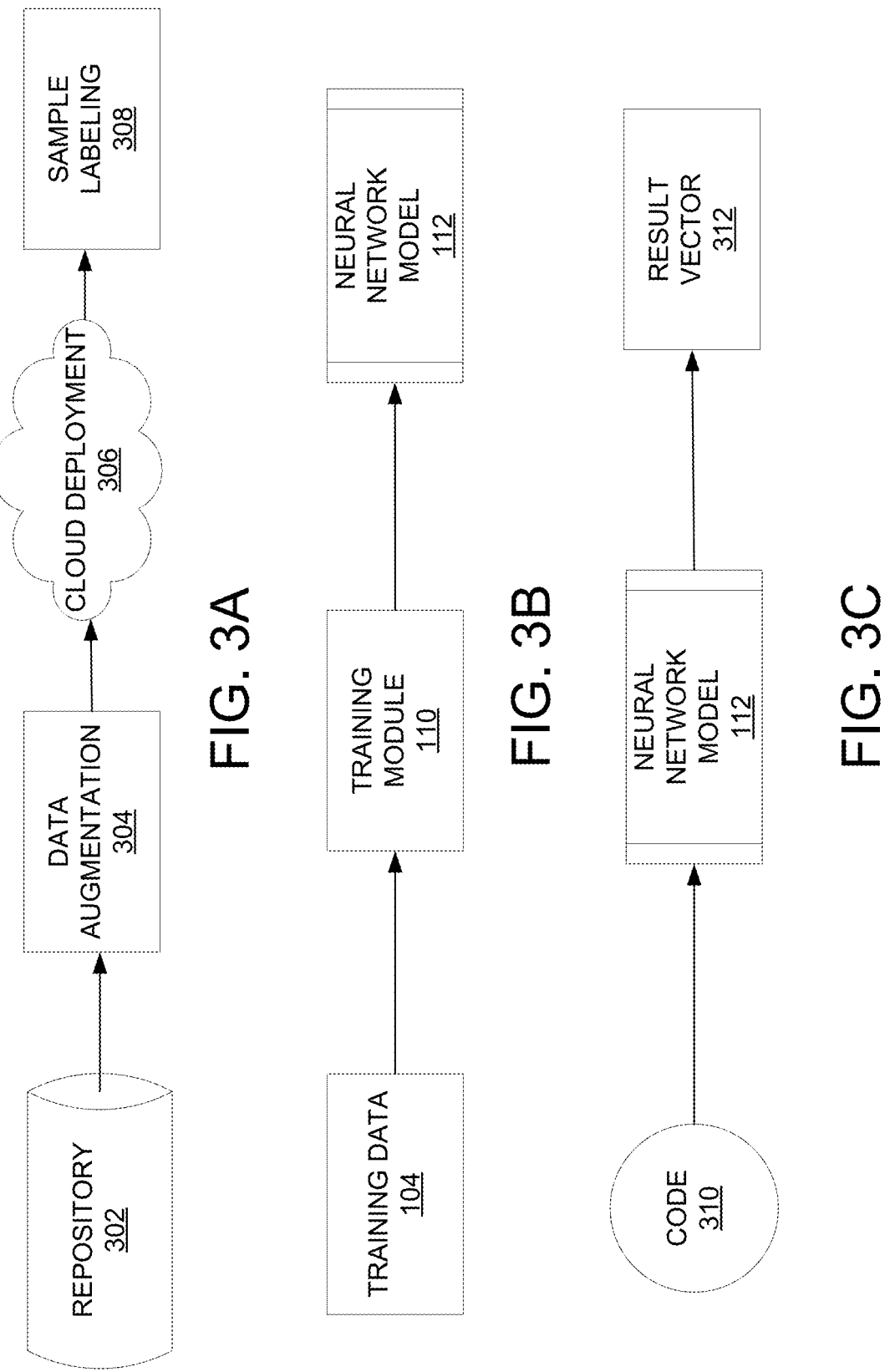
FIGS. 3A-3D illustrate exemplary functional diagrams of the shifting left module within the computing device of FIG. 1, in accordance with one or more embodiments of the present disclosure.
Figure 3D:
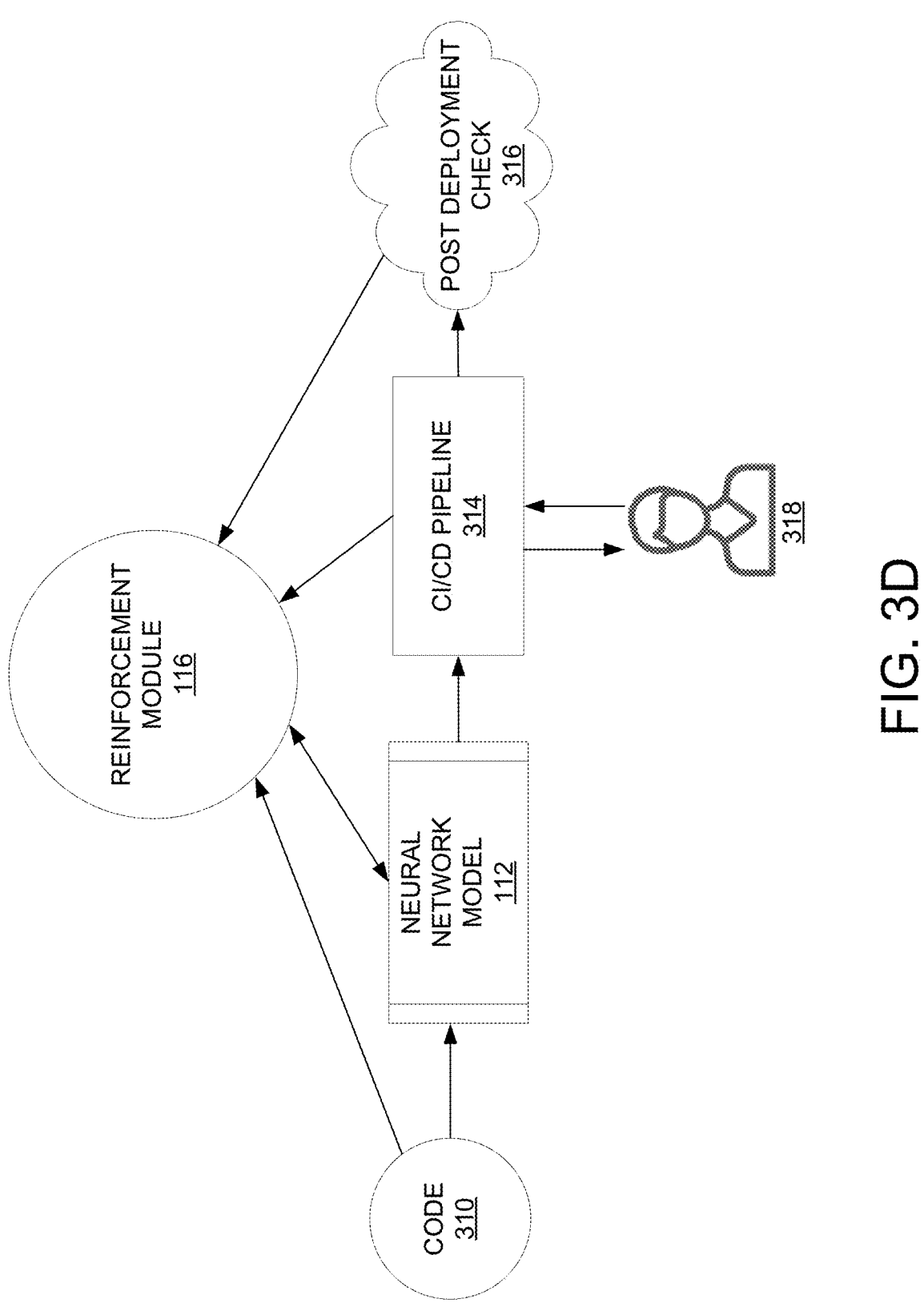

The present disclosure will now be described in detail with reference to the Figures. FIG. 1 is a functional block diagram illustrating a policy security shifting left environment, generally designated 100, in accordance with an embodiment of the present disclosure.

In the depicted embodiment, policy security shifting left environment 100 includes computing device 102, training data 104, and network 108. In one or more embodiments, training data 104 is sample data as input to train neural network model 112. Training data 104 may be collected with samples for various clouds and languages. Training data 104 may be generated by leveraging existing infrastructure as codes that can be found in public repositories, for example, in GitHub, which may be a web-based version-control and collaboration platform for software developers. Training data 104 may be augmented and expanded by using code fuzz techniques. Fuzz techniques can be, for example, adding random characters or keywords to code, genetic combination of various pieces of code from various samples, syntax specific code insertion, code scrambling, and any other known genetic/fuzz technique. Training data 104 may be labelled by a vector of labels that present the result of deploying the code and running post-deployment checks on a deployed account. The labels may represent compliance check results, as well as other types of checks like cost-estimate or performance estimate. Training data 104 may be augmented by using code generation techniques. For example, shifting left module 106 may add random keywords to code/syntax specific code insertion in training data 104. Shifting left module 106 may get genetic combination of various pieces of code from various data samples. Shifting left module 106 may re-order code blocks and code line within a block in training data 104. Shifting left module 106 may apply deploy and fetch (for example: "terraform apply", followed by "terraform import") to training data 104. Shifting left module 106 may apply code transformation techniques, for example, renaming tokens along codes. Shifting left module 106 may label a code by deploying the code to a cloud account and running configuration scan on the code. After training data 104 is generated and labeled, shifting left module 106 may train neural network model 112 to classify code and provide a vector of scores per policy.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to shifting left module 106 and network 108 and is capable of processing program instructions and executing shifting left module 106, in accordance with an embodiment of the present disclosure. Computing device 102 may include internal and external hardware components, as depicted and described in further detail with respect to FIG. 4.

Further, in the depicted embodiment, computing device 102 includes shifting left module 106. In the depicted embodiment, shifting left module 106 is located on computing device 102. However, in other embodiments, shifting left module 106 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and shifting left module 106, in accordance with a desired embodiment of the disclosure.

In one or more embodiments, shifting left module 106 is configured to train neural network model 112 with training data 104 to classify infrastructure as codes per policy and provide a policy vector score for each code to applicable policies. In an example, neural network model 112 may be a deep neural network. In other examples, neural network model 112 may be a convolutional neural network, a recurrent neural network, a transformer neural network, or any other suitable neural network. In another example, neural network model 112 can be a combination of a convolutional neural network and a recurrent neural network. The applicable policies can be, for example, industry-specific methodology requirements, cost estimate checks, project-specific tests or any other suitable policies that the codes need to comply, for example, policies controlled by National Institute of Standards and Technology (NIST).

Shifting left module 106 may receive training data 104 as input to train neural network model 112. Shifting left module 106 may collect data samples from a public repository. Shifting left module 106 may augment the data samples with a code fuzz technique. Shifting left module 106 may label the data samples with a vector of labels that present a result of code deployment checks. Shifting left module 106 may provide the labeled data samples as training data 104 to train the neural network model. Training data 104 may be generated by leveraging existing infrastructure as codes that can be found in public repositories, for example, in GitHub, which may be a web-based version-control and collaboration platform for software developers. Shifting left module 106 may expand training data 104 by using code fuzz techniques. Fuzz techniques can include, for example, adding random characters or keywords to a code, creating genetic combination of various pieces of code from various samples, performing syntax specific code insertion, code scrambling, and any other genetic/fuzz technique. Shifting left module 106 may label training data 104 by a vector of labels that present a result of deploying the code and running post-deployment checks on a deployed account. The labels may represent compliance check results, as well as other types of checks like cost-estimate or performance estimate. Shifting left module 106 may augment training data 104 by using code generation techniques. For example, shifting left module 106 may add random keywords to code/syntax specific code insertion in training data 104. Shifting left module 106 may get genetic combination of various pieces of code from various data samples. Shifting left module 106 may re-order code blocks and code lines within a block in training data 104. Shifting left module 106 may apply deploy and fetch (for example: "terraform apply", followed by "terraform import") to training data 104. Shifting left module 106 may apply code transformation techniques, for example, renaming tokens along codes. Shifting left module 106 may label a code by deploying the code to a cloud account and running a configuration scan on the code. After training data 104 is generated and labeled, shifting left module 106 may train neural network model 112 to classify code and provide a vector of scores per policy.

In one or more embodiments, shifting left module 106 is configured to enable neural network model 112 to scan and score a code (e.g., infrastructure as code) during a continuous integration and continuous deployment pipeline. Shifting left module 106 may perform scanning the code when a user types the code. Shifting left module 106 may perform scanning the code per a request by a user. Shifting left module 106 may scan the code during the continuous integration and continuous deployment pipeline. Shifting left module 106 may generate a policy vector score for the code. The policies can be, for example, industry-specific methodology requirements, cost estimate checks, project-specific tests or any other policies, for example, controlled by NIST. The policy vector score may be a vector of scores for each related policy applied to the code. The range of each score may be defined as from zero (0) to one (1). For example, the lower score may indicate the code has a lower possibility to comply an applicable policy. The higher score may indicate the code has a higher possibility to comply an applicable policy. The range of each score may be defined as in some other formats.

In one or more embodiments, shifting left module 106 is configured to output a scanned result (e.g., a policy vector score) for a code from neural network model 112 to a user. Shifting left module 106 may provide the scanned result as a warning, or a blocking alert. For example, shifting left module 106 may give a warning to the user when the score is low. The lower score may indicate that the code has a lower possibility to comply an applicable policy. The higher score may indicate that the code has a higher possibility to comply an applicable policy.

In one or more embodiments, shifting left module 106 is configured to retrain neural network model 112 with additional sample data captured during a continuous integration and continuous deployment change and run-time compliance posture that occurs as a response by the user. Shifting left module 106 may constantly update neural network model 112 by comparing scanned results to actual results of infrastructure as code deployed, and by collecting user-interaction with the scanned results. Shifting left module 106 may update neural network model 112 by comparing proposed results to actual results of an infrastructure as codes deployed, and by collecting user-interaction with proposed results. Shifting left module 106 may capture users' interactions with the scanned results. Shifting left module 106 may use the captured users' interactions for retraining and user-customization purposes. When an infra-structure as code is deployed, shifting left module 106 may capture the actual results of testing the run-time account and use the actual results for retraining neural network model 112.

Further, in the depicted embodiment, shifting left module 106 includes training module 110, neural network model 112, inference module 114, and reinforcement module 116. In one or more embodiments, training module 110 is configured to train neural network model 112 with training data 104 to classify infrastructure as codes per policy and provide a policy vector score for each code to applicable policies. The applicable policies can be, for example, industry-specific methodology requirements, cost estimate checks, project-specific tests or any other suitable policies that the codes need to comply, for example, policies controlled NIST. Training module 110 may receive training data 104 as input to train neural network model 112. Training data 104 may be generated by leveraging existing infrastructure as codes that can be found in public repositories, for example, in GitHub, which may be a web-based version-control and collaboration platform for software developers. Training module 110 may expand training data 104 by using code fuzz techniques. Fuzz techniques can include, for example, adding random characters or keywords to a code, creating genetic combination of various pieces of code from various samples, performing syntax specific code insertion, code scrambling, and any other genetic/fuzz technique. Training module 110 may label training data 104 by a vector of labels that present a result of deploying the code and running post-deployment checks on a deployed account. The labels may represent compliance check results, as well as other types of checks like cost-estimate or performance estimate. Training module 110 may augment training data 104 by using code generation techniques. For example, training module 110 may add random keywords to code/syntax specific code insertion in training data 104. Training module 110 may create genetic combination of various pieces of code from various data samples. Training module 110 may re-order code blocks and code lines within a block in training data 104. Training module 110 may apply deploy and fetch (for example: "terraform apply", followed by "terraform import") to training data 104. Training module 110 may apply code transformation techniques, for example, renaming tokens along codes. Training module 110 may label a code by deploying the code to a cloud account and running a configuration scan on the code. After training data 104 is generated and labeled, training module 110 may train neural network model 112 to classify code and provide a vector of scores per policy.

In one or more embodiments, neural network model 112 is a deep neural network. In other examples, neural network model 112 may be a convolutional neural network, a recurrent neural network, a transformer neural network, or any other suitable neural network. In another example, neural network model 112 can be a combination of a convolutional neural network and a recurrent neural network.

In one or more embodiments, inference module 114 is configured to enable neural network model 112 to scan and score a code (e.g., infrastructure as code) during a continuous integration and continuous deployment pipeline. Inference module 114 may perform scanning the code when a user types the code. Inference module 114 may perform scanning the code per a request by a user. Inference module 114 may scan the code during the continuous integration and continuous deployment pipeline. Inference module 114 may generate a policy vector score for the code. The policies can be, for example, industry-specific methodology requirements, cost estimate checks, project-specific tests or any other policies, for example, controlled by NIST. The policy vector score may be a vector of scores for each related policy applied to the code. The range of each score may be defined as from zero (0) to one (1). For example, the lower score may indicate the code has a lower possibility to comply an applicable policy. The higher score may indicate the code has a higher possibility to comply an applicable policy. The range of each score may be defined as in some other formats. Inference module 114 may output a scanned result (e.g., a policy vector score) for a code from neural network model 112 to a user. Inference module 114 may provide the scanned result as a warning, or a blocking alert. For example, inference module 114 may provide a warning or alert to the user when the score is low. The lower score may indicate that the code has a lower possibility to comply an applicable policy. The higher score may indicate that the code has a higher possibility to comply an applicable policy.

In one or more embodiments, reinforcement module 116 is configured to retrain neural network model 112 with additional sample data captured during a continuous integration and continuous deployment change and run-time compliance posture that occurs as a response by the user. Reinforcement module 116 may constantly update neural network model 112 by comparing scanned results to actual results of infrastructure as code deployed, and by collecting user-interaction with the scanned results. Reinforcement module 116 may update neural network model 112 by comparing proposed results to actual results of an infrastructure as codes deployed, and by collecting user-interaction with proposed results. Reinforcement module 116 may capture users' interactions with the scanned results. Reinforcement module 116 may use the captured users' interactions for retraining and user-customization purposes. When an infrastructure as code is deployed, reinforcement module 116 may capture the actual results of testing the run-time account and use the actual results for retraining neural network model 112.

FIG. 2 is a flowchart 200 depicting operational steps of shifting left module 106 in accordance with an embodiment of the present disclosure.

Shifting left module 106 operates to train neural network model 112 to classify a code per policy and provide a policy vector score for the code associated with one or more policies. Shifting left module 106 also operates to enable neural network model 112 to scan and score a new code during a continuous integration and continuous deployment pipeline. Shifting left module 106 operates to output a scanned score of the new code to a user. Shifting left module 106 operates to retrain neural network model 112 by capturing a continuous integration and continuous deployment change and run-time compliance posture that occurs as a response by the user.

In step 202, shifting left module 106 may train neural network model 112 to classify a code per policy and provide a policy vector score for the code associated with one or more policies. Shifting left module 106 may train neural network model 112 with training data 104 to classify infrastructure as codes per policy and provide a policy vector score for each code to applicable policies. In an example, neural network model 112 may be a deep neural network. In other examples, neural network model 112 may be a convolutional neural network, a recurrent neural network, a transformer neural network, or any other suitable neural network. In another example, neural network model 112 can be a combination of a convolutional neural network and a recurrent neural network. The applicable policies can be, for example, industry-specific methodology requirements, cost estimate checks, project-specific tests or any other suitable policies that the codes need to comply, for example, policies controlled by NIST. Shifting left module 106 may receive training data 104 as input to train neural network model 112. Training data 104 may be generated by leveraging existing infrastructure as codes that can be found in public repositories, for example, in GitHub, which may be a web-based version-control and collaboration platform for software developers. Shifting left module 106 may expand training data 104 by using code fuzz techniques. Fuzz techniques can include, for example, adding random characters or keywords to a code, creating genetic combination of various pieces of code from various samples, performing syntax specific code insertion, code scrambling, and any other genetic/fuzz technique. Shifting left module 106 may label training data 104 by a vector of labels that present a result of deploying the code and running post-deployment checks on a deployed account. The labels may represent compliance check results, as well as other types of checks like cost-estimate or performance estimate. Shifting left module 106 may augment training data 104 by using code generation techniques. For example, shifting left module 106 may add random keywords to code/syntax specific code insertion in training data 104. Shifting left module 106 may get genetic combination of various pieces of code from various data samples. Shifting left module 106 may re-order code blocks and code lines within a block in training data 104. Shifting left module 106 may apply deploy and fetch (for example: "terraform apply", followed by "terraform import") to training data 104. Shifting left module 106 may apply code transformation techniques, for example, renaming tokens along codes. Shifting left module 106 may label a code by deploying the code to a cloud account and running a configuration scan on the code. After training data 104 is generated and labeled, shifting left module 106 may train neural network model 112 to classify code and provide a vector of scores per policy.

In step 204, shifting left module 106 enables neural network model 112 to scan and score a new code during a continuous integration and continuous deployment pipeline. Shifting left module 106 may enable neural network model 112 to scan and score a code (e.g., infrastructure as code) during the continuous integration and continuous deployment pipeline. Shifting left module 106 may perform scanning the code when a user types the code. Shifting left module 106 may perform scanning the code per a request by a user. Shifting left module 106 may scan the code during the continuous integration and continuous deployment pipeline. Shifting left module 106 may generate a policy vector score for the code. The policies can be, for example, industry-specific methodology requirements, cost estimate checks, project-specific tests or any other policies, for example, controlled by NIST. The policy vector score may be a vector of scores for each related policy applied to the code. The range of each score may be defined as from zero (0) to one (1). For example, the lower score may indicate the code has a lower possibility to comply an applicable policy. The higher score may indicate the code has a higher possibility to comply an applicable policy. The range of each score may be defined as in some other formats.

In step 206, shifting left module 106 outputs a scanned score of the new code to a user. Shifting left module may output a scanned result (e.g., a policy vector score) for a code from neural network model 112 to a user. Shifting left module 106 may provide the scanned result as a warning, or a blocking alert. For example, shifting left module 106 may give a warning to the user when the score is low. The lower score may indicate that the code has a lower possibility to comply an applicable policy. The higher score may indicate that the code has a higher possibility to comply an applicable policy.

In step 208, shifting left module 106 retrains neural network model 112 by capturing a continuous integration and continuous deployment change and run-time compliance posture that occurs as a response by the user. Shifting left module 106 may retrain neural network model 112 with additional sample data captured during a continuous integration and continuous deployment change and run-time compliance posture that occurs as a response by the user. Shifting left module 106 may constantly update neural network model 112 by comparing scanned results to actual results of infrastructure as code deployed, and by collecting user-interaction with the scanned results. Shifting left module 106 may update neural network model 112 by comparing proposed results to actual results of an infrastructure as codes deployed, and by collecting user-interaction with proposed results. Shifting left module 106 may capture users' interactions with the scanned results. Shifting left module 106 may use the captured users' interactions for retraining and user-customization purposes. When an infrastructure as code is deployed, shifting left module 106 may capture the actual results of testing the run-time account and use the actual results for retraining neural network model 112.

FIGS. 3A-3D illustrate exemplary functional diagrams of shifting left module 106 in accordance with one or more embodiments of the present disclosure.

In the examples of FIGS. 3A-3D, shifting left module 106 may collect data samples for various clouds and languages in repository 302. For example, repository 302 can be a publicly available repository, e.g., GitHub, which may be a web-based version-control and collaboration platform for software developers. Shifting left module 106 may augment data samples by using various code fuzz techniques in data augmentation 304. Shifting left module 106 may label data samples by a vector of labels that present a result of deploying codes and running cloud deployment 306 checks on a deployed account. The labels may represent compliance check results, as well as other types of checks like cost-estimate or performance estimate. After data samples are generated and labeled, shifting left module 106 may use data samples as training data 104 to train neural network model 112 with training module 110 to classify various codes and provide a vector of scores per policy. Training module 110 may train a deep neural network to neural network model 112, e.g., a classification model. Once neural network model 112 is trained, shifting left module 106 may scan code 310 (e.g., infrastructure as code) during continuous integration and continuous deployment pipeline 314. Shifting left module 106 may scan code 310 when a user types code 310. Shifting left module 106 may generate result vector 312, e.g., a policy vector score, for code 310. Result vector 312 may be a vector of scores for each related policy applied to code 310. Reinforcement module 116 may retrain neural network model 112 with additional sample data captured during continuous integration and continuous deployment pipeline 314 with a change and run-time compliance posture that occurs as a response by user 318. Reinforcement module 116 may constantly update neural network model 112 by comparing scanned results to actual results of code 310 deployed with post deployment check 316, and by collecting user-interaction with the scanned results. Reinforcement module 116 may use the captured users' interactions for retraining and user-customization purposes.

Figure 4:
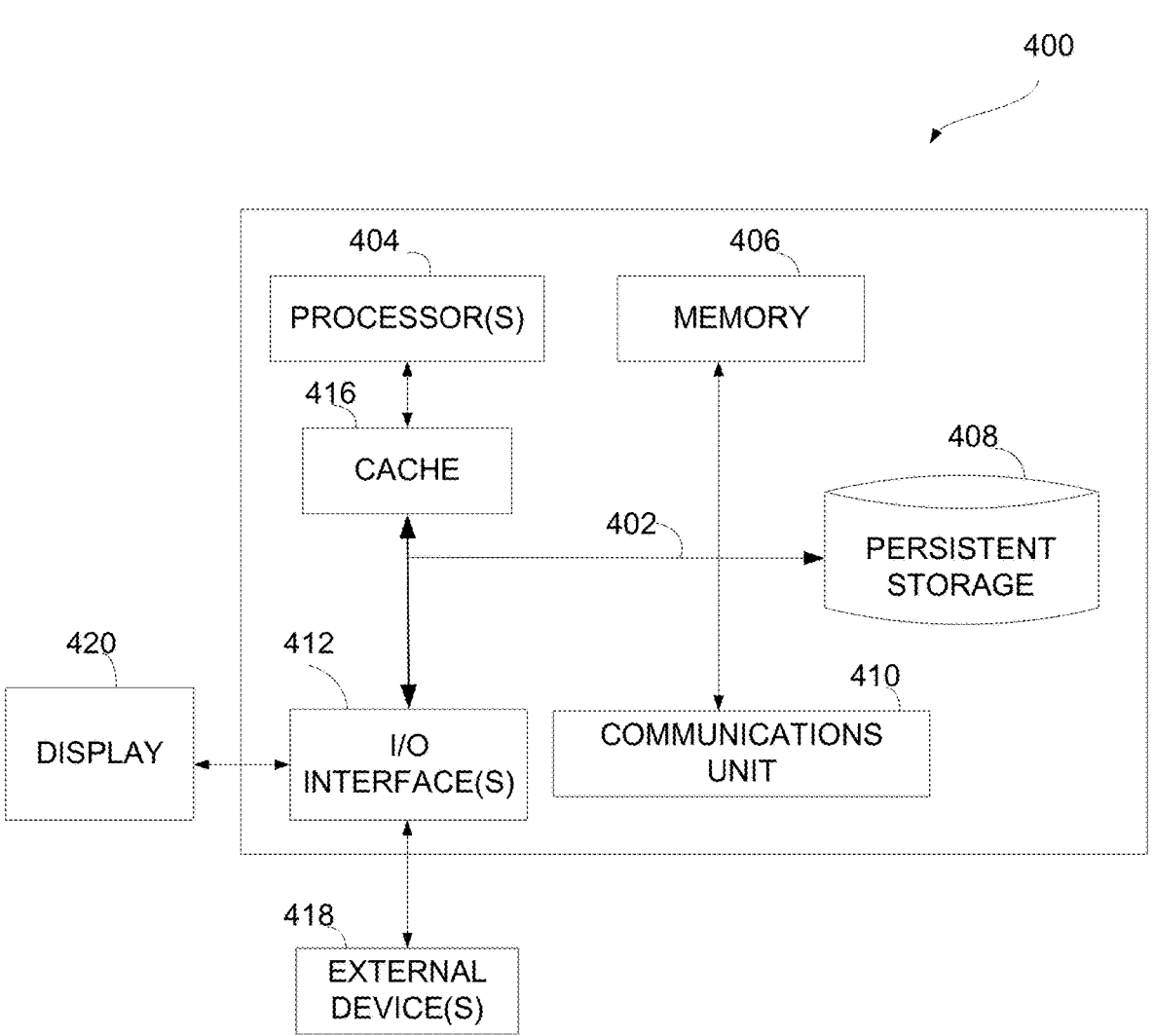
FIG. 4 is a block diagram of components of the computing device of FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Shifting left module 106 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Shifting left module 106 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., shifting left module 106 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
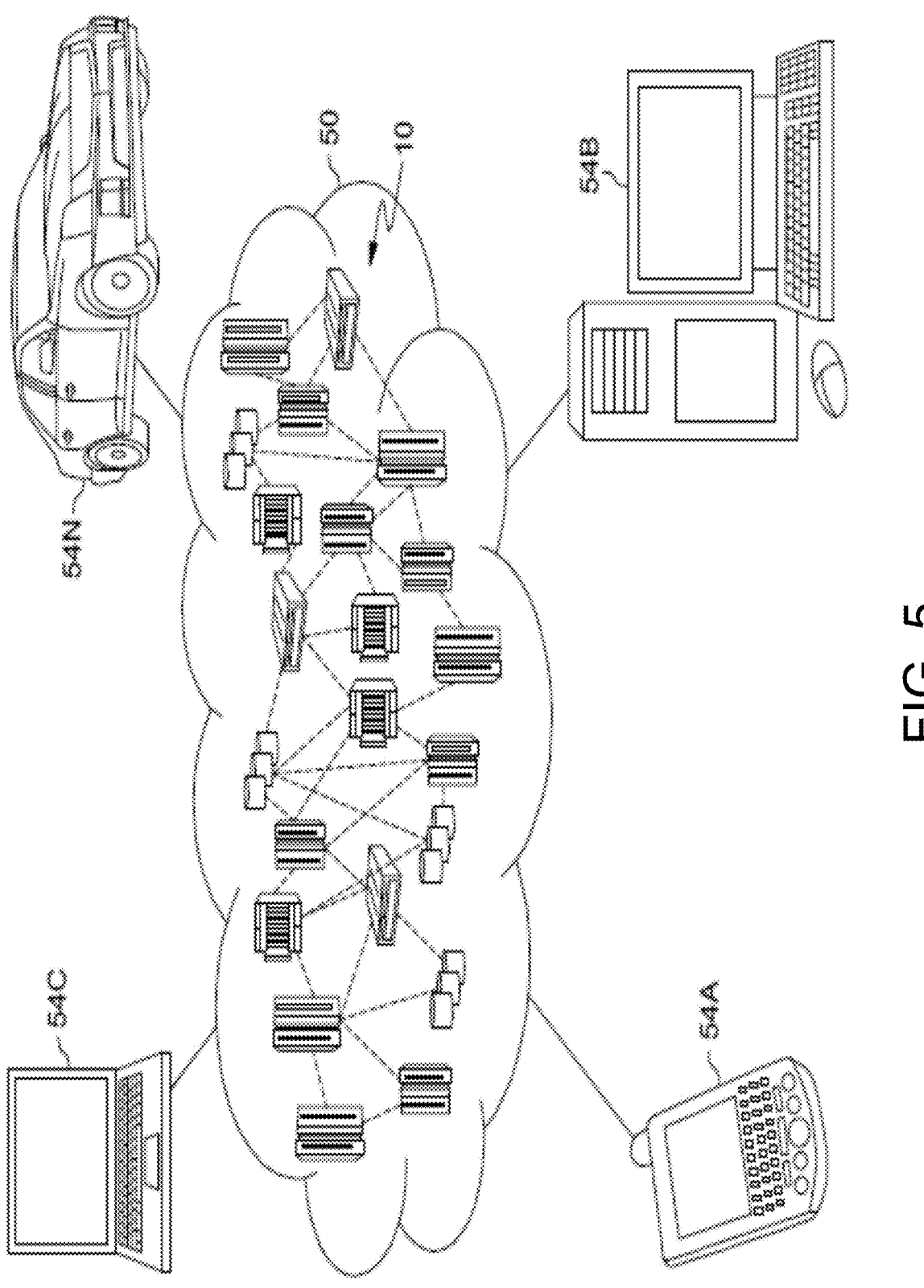
FIG. 5 depicts an embodiment of a cloud computing environment in accordance with the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
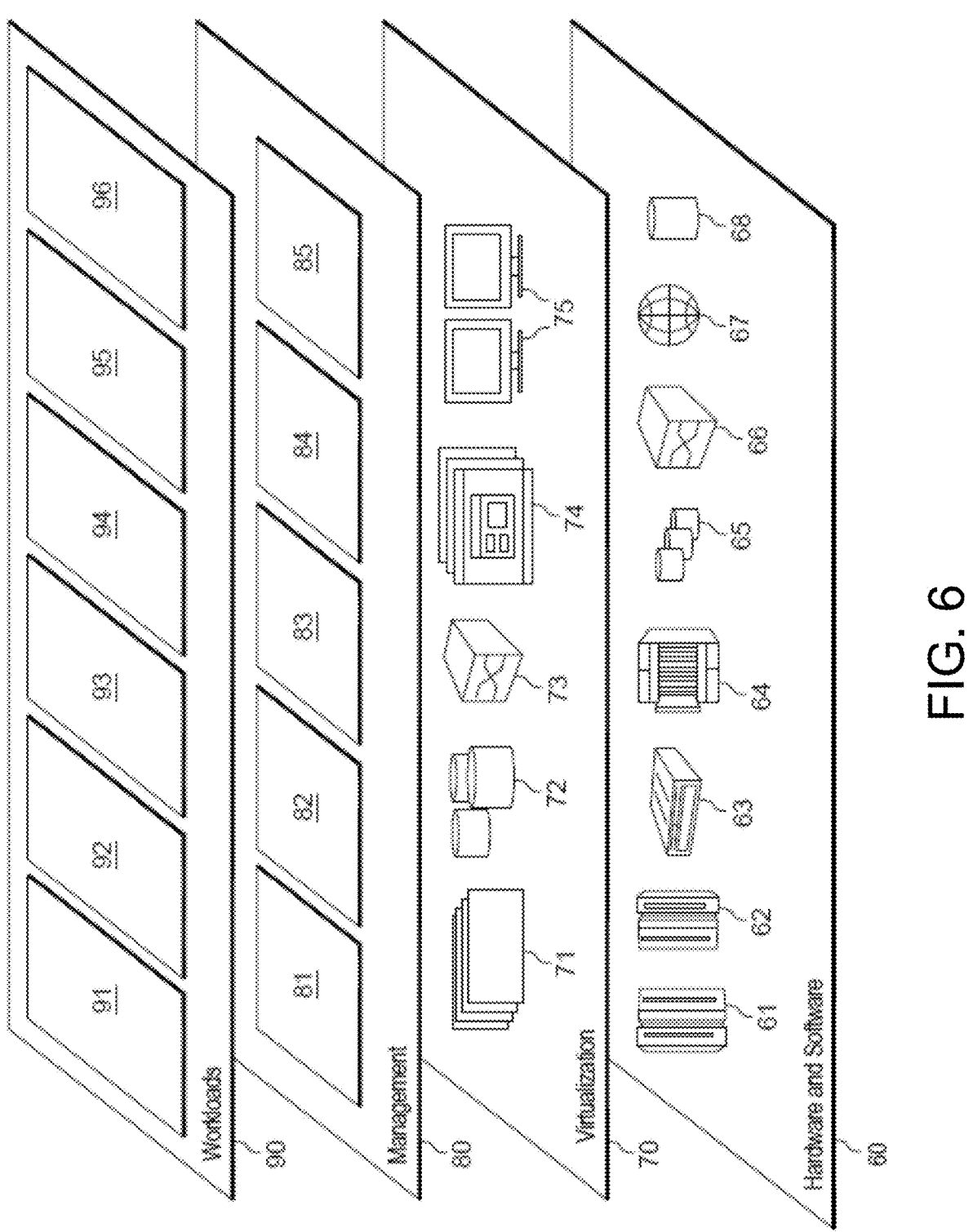
FIG. 6 depicts an embodiment of abstraction model layers of a cloud computing environment, in accordance with the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, shifting left module 106 as described above with respect to policy security shifting left environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
training, by one or more processors using training data, a neural network model to classify a code, included in the training data, per policy of a plurality of policies and provide a vector of scores for the code,
wherein each score of the vector of scores indicates a level of possibility of complying with a respective policy of the plurality of policies,
wherein the training the neural network model includes adjusting weights of interconnections between intermediate layers of the neural network model,
wherein the training data includes one or more modifications of the code, and
wherein the one or more modifications of the code are selected from a group consisting of an addition of random keywords to the code, a scrambling of the code, blocks of the code re-ordered, lines within a block of the code re-ordered, tokens of the code renamed, and combinations thereof, and
wherein the training data is labeled using a vector of labels indicating a compliance check result of deploying the code and a cost-estimate or a performance-estimate of deploying the code;
generating a blocking alert based at least in part on a determination of a magnitude of the vector of scores for the code; and
retraining, by one or more processors, the neural network model by capturing a continuous integration and continuous deployment change and run-time compliance posture that occurs as a response by a user, and
wherein the neural network model is a convolutional neural network model, a recurrent neural network model, a transformer neural network model, or a combination of the convolutional neural network model and the recurrent neural network model.

2. The computer-implemented method of claim 1, further comprising:
enabling the neural network model,
wherein the enabling includes scanning a new code while the user types the new code.

3. The computer-implemented method of claim 1, wherein the code is an infrastructure as code.

4. The computer-implemented method of claim 1, wherein the plurality of policies comprises an industry-specific methodology requirement and a cost estimate check.

5. A non-transitory computer-readable medium storing a set of instructions for wireless communication, the set of instructions comprising:
one or more instructions that, when executed by one or more processors of a device, cause the device to:
train, using training data, a neural network model to classify a code, included in the training data, per policy of a plurality of policies and provide a vector of scores for the code, wherein each score of the vector of scores indicates a level of possibility of complying with a respective policy of the plurality of policies, wherein the one or more instructions, to cause the device to train the neural network model, cause the device to adjust weights of interconnections between intermediate layers of the neural network model, wherein the training data includes one or more modifications of the code, and wherein the one or more modifications of the code included in the training data are selected from a group consisting of an addition of random keywords to the code, a scrambling of the code, blocks of the code re-ordered, lines within a block of the code re-ordered, tokens of the code renamed, and combinations thereof, and wherein the training data is labeled using a vector of labels indicating a compliance check result of deploying the code and a cost-estimate or a performance-estimate of deploying the code;
generate a blocking alert based at least in part on a determination of a magnitude of the vector of scores for the code; and
retrain the neural network model by capturing a continuous integration and continuous deployment change and run-time compliance posture that occurs as a response by a user, and
wherein the neural network model is a convolutional neural network model, a recurrent neural network model, a transformer neural network model, or a combination of the convolutional neural network model and the recurrent neural network model.

6. The non-transitory computer-readable medium of claim 5, wherein the one or more instructions cause the device to:
enable the neural network model which includes program instructions to scan a new code while the user types the new code.

7. The non-transitory computer-readable medium of claim 5, wherein the code is an infrastructure as code.

8. The non-transitory computer-readable medium of claim 5, wherein the plurality of policies comprises an industry-specific methodology requirement and a cost estimate check.

9. A computer system, comprising:
one or more processors; and
one or more memory devices coupled to the one or more processors, wherein the one or more processors are configured to:
train a neural network model using training data to classify a code, included in the training data, per policy of a plurality of policies and provide a vector of scores for the code, wherein each score of the vector of scores indicates a level of possibility of complying with a respective policy of the plurality of policies, wherein the one or more processors, to train the neural network model, are configured to adjust weights of interconnections between intermediate layers of the neural network model, wherein the training data includes one or more modifications of the code, and wherein the one or more modifications of the code are selected from a group consisting of an addition of random keywords to the code, a scrambling of the code, blocks of the code re-ordered, lines within a block of the code re-ordered, tokens of the code renamed, and combinations thereof, and wherein the training data is labeled using a vector of labels indicating a compliance check result of deploying the code and a cost-estimate or a performance-estimate of deploying the code;

generate a blocking alert based at least in part on a determination of a magnitude of the vector of scores for the code; and retrain the neural network model by capturing a continuous integration and continuous deployment change and run-time compliance posture that occurs as a response by a user, and wherein the neural network model is a convolutional neural network model, a recurrent neural network model, a transformer neural network model, or a combination of the convolutional neural network model and the recurrent neural network model.

10. The computer system of claim 9, wherein the one or more processors are configured to:

enable the neural network model which includes program instructions to scan a new code while the user types the new code.

11. The computer system of claim 9, wherein the code is an infrastructure as code.

12. The computer system of claim 9, wherein the plurality of policies comprises an industry-specific methodology requirement and a cost estimate check.

13. The computer-implemented method of claim 1, wherein the training data comprises a vector of labels that present a result of deploying the code and running post-deployment checks on a deployed account.

14. The computer-implemented method of claim 1, further comprising:

labeling another code by deploying the code to a cloud account and running a configuration scan on the code.

15. The computer-implemented method of claim 1, wherein each score in the vector of scores has a value that increases as the code has a higher probability of complying with the respective policy.

\* \* \* \* \*